Dec. 18, 1962   B. PARKER   3,068,704
GAS BEARING ACCELEROMETER
Filed June 24, 1960
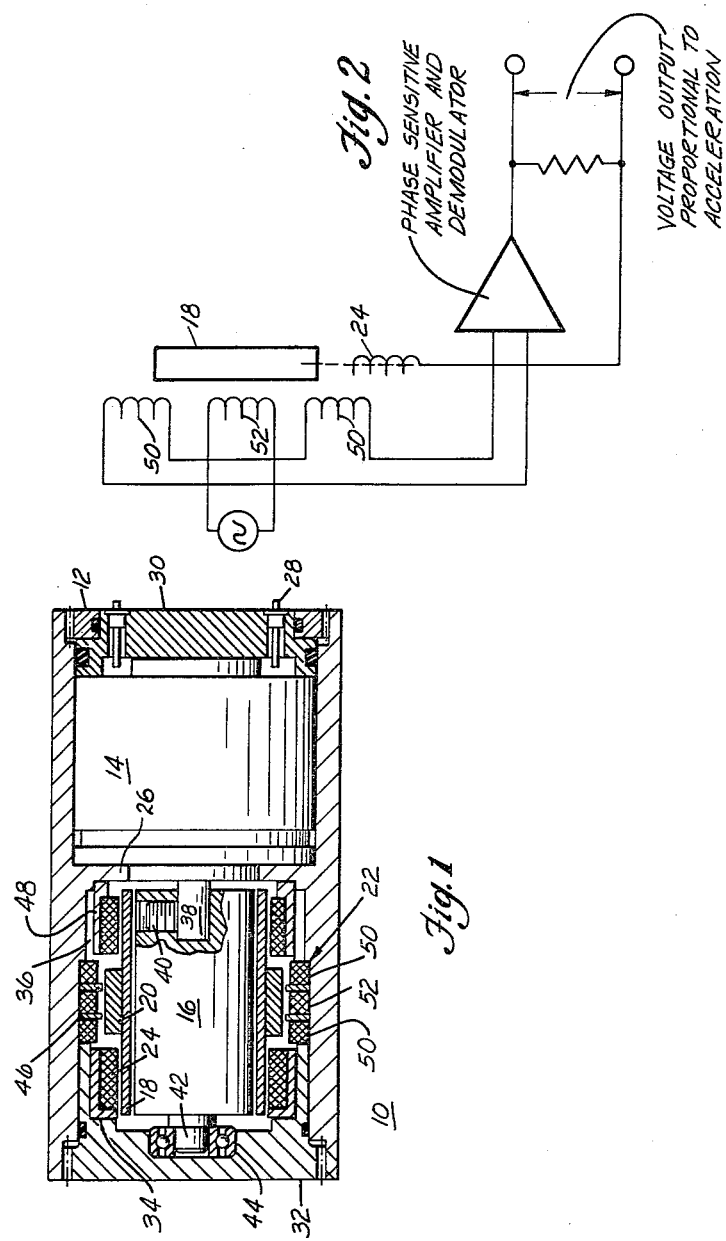
BERNARD PARKER
INVENTOR.
BY Andrew L. Bain
Sal A. Giarratana
ATTORNEYS

United States Patent Office 3,068,704
Patented Dec. 18, 1962

3,068,704
GAS BEARING ACCELEROMETER
Bernard Parker, Teaneck, N.J., assignor to General Precision Inc., Little Falls, N.J., a corporation of Delaware
Filed June 24, 1960, Ser. No. 38,528
1 Claim. (Cl. 73—516)

The present invention relates to an accelerometer and more particularly to an acceleration sensing device having a floating proof mass responsive to acceleration.

Some presently known acceleration sensing devices utilize pendulums in electrolytic solution wherein the unit functions as an electrolytic potentiometer to determine the displacement of the pendulm with respect to its case so that the displacement is a function of the acceleration. Other types of acceleration sensing devices provide for a pendulum structure restrained by spring means or a magnetic field, or use a proof mass responsive to acceleration which is restrained by spring means or magnetic means serving as the restoring means. Hence, presently used acceleration sensing devices, using either pendulms or proof masses as the acceleration sensing means, are restrained, after reacting to acceleration, by spring means, magnetic means, or the like type of restraining means.

These presently used restraining means for acceleration sensing devices interfere with the measurement of the acceleration force, and have a tendency to cause non-linearities and hysteresis effects. The interference on the acceleration sensing device by the restraining means is caused by friction, internal in the springs or viscous in the fluid, or external friction with the supporting means of the pendulum or the proof mass. For example, in spring restraining means, hysteresis caused by strains, heat, and the like phenomena, changes the null of the no-load length of the springs over the period of use. Accordingly, the use of restraining means in acceleration sensing devices results in an element of error or inconstancy in the results obtained therefrom.

The present invention comprises an acceleration sensing device provided with a proof mass suspended about a rotating shaft by a thin film of fluid. The proof mass is formed as a cylindrical sleeve concentrically mounted about the rotating shaft, with the clearance therebetween being in the order of a ten thousandth of an inch, so that rotation of the shaft forms a thin pressurized film between the shaft and sleeve. The film causes the sleeve to ride or float in a substantially concentric attitude about the shaft, so that the only support for the sleeve, or proof mass, is the film of pressurized fluid or atmosphere.

In the present device, the sleeve per se does not respond to acceleration forces acting upon the shaft along the common axis of the rotating shaft and the sleeve. Thus, when the shaft is accelerated or decelerated along this common axis, the sleeve tends to remain in its original spacial attitude. Pick-off means, cooperating with magnetic means fixed to the sleeve, sense any axial displacement between the rotating shaft and the sleeve proof mass. In brief, the pick-off means on its sensing axis detects displacement of the proof mass sleeve from its unaccelerated position, relative to the rotating shaft. The output of the pick-off means is amplified, demodulated, and fed back to restoring means. The magnitude and polarity of the current in the restoring means is a measure of the acceleration along the input axis of the acceleration sensing device.

For any accelerometer the restoring force resisting the force of an acceleration on the pendulm or proof mass, depending on what is used as the acceleration sensing means, is the algebraic sum of the force exerted by the suspension system of the acceleration sensitive means and the force exerted by the restoring means. Consequently, the present invention, utilizing a gas bearing mounting for the acceleration sensing means, has essentially zero friction and hysteresis, and zero bias producing forces, such as produced by a Hooke's joint or spring suspension, and no mechanical spring rate as experienced with a spring suspension system. Hence, the present device is a highly efficient acceleration sensing device permitting extremely accurate navigational and control systems for aircraft, and the like vehicles.

An object of the present invention is the provision of an accelerometer utilizing a gas bearing for the acceleration sensing means to substantially eliminate friction and hysteresis, bias producing forces, such as produced by a Hooke's joint or spring suspension, and mechanical spring rate as experienced with a spring suspension system.

Another object is to provide an accelerometer with a floating proof mass.

A further object of the invention is the provision of an accelerometer adapted to measure acceleration with a minimum of restraint on the proof mass.

Another further object is to provide an accelerometer having a proof mass suspended about a rotating shaft by a thin film of fluid.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIGURE 1 is a cross sectional view of a preferred embodiment of the invention; and FIGURE 2 is a schematic diagram of the circuit employed in the device of FIGURE 1.

Referring now to the drawing, there is illustrated a preferred embodiment 10 comprising a cylindrical housing 12 containing a power source 14 provided with a cylindrical driving shaft 16 having one end thereof journaled in an end wall of the housing. A sleeve or proof mass 18 is coaxially mounted about the drive shaft 16 and radially spaced therefrom. The proof mass is provided with a permanent magnet ring 20 externally fixed thereto and intermediate the ends thereof. An E-bridge pick-off 22 is fixed to the interior of the housing 12 in a radial alignment with the permanent magnet ring 20 and spaced therefrom a predetermined amount. A pair of axially spaced restoring coils 24 are provided within the housing in approximate axial alignment with the magnet ring 20 and are responsive to the output of the E-bridge pick-off to restore the proof mass to its unaccelerated position with respect to the pick-off.

The cylindrical housing 12 is provided with an interior flange 26 separating the housing into two compartments. One compartment contains the power source 14, such as a conventional miniature electric motor, having suitable terminal means 28, extending through suitable apertures in an end cap 30, to provide coupling means to an external source of electricity. Additional terminals are provided through the end cap for obtaining the signal output of the embodiment as an indication of the acceleration along the axis of the housing. The end cap 30 is provided with suitable sealing means, such as the illustrated O-rings, to maintain the housing airtight. The other end of the housing is provided with another end cap 32 having suitable O-ring sealing means and formed with an integral radial flange 34 supporting one of the restoring coils 24 within a housing chamber 36. The chamber 36, separated from the motor chamber by the flange 26, is provided with a suitable fluid medium, such as air helium, or the like, which is sealed therein by the end caps 30 and 32, and the associated sealing means.

The motor 14 is provided with an output shaft 38 supporting thereon the driving shaft 16. Suitable securing means, such as a set screw 40, interconnect the driving shaft and the output shaft to prevent any relative rotation therebetween. The drive shaft is formed with an integral axial extension 42 journaled in a bearing 44 mounted within the housing end cap 32. In this manner, the drive shaft 16 is axially and radially fixed along the acceleration or longitudinal axis of the housing. The drive shaft is composed of a suitable metal, such as aluminum, or the like, to maintain the weight at a predetermined amount depending on the size of the motor and the desired gross weight of the device.

The proof mass 18 consists of a cylindrical sleeve composed of a suitable metal, such as an iron alloy, or the like, having the permanent magnet ring 20 fixed to the exterior peripheral surface at a position intermediate the ends thereof. The proof mass, along with the permanent magnet ring, is maintained in its unaccelerated position with respect to the E-bridge pick-off 22 by a pair of rings 46 located between the pick-off coils and the pick-off excitation portion of the E-bridge. The rings 46 are formed as resilient split rings fitting within suitable channels formed on the interior surface of the housing 12, and are radially spaced from the magnet ring a predetermined amount. In this manner, the rings 46 and the permanent magnet ring 20 co-act, due to the magnetic forces therebetween, to maintain a retarding or drag force on the proof mass in its rotation relative to the driving shaft 16. In brief, the rings 46, composed of a suitable magnetic material, co-act with the permanent magnet ring 20 in such manner that the relative rotation between the rings and the magnet ring generates eddy currents which, in turn, produce a magnet flux opposite in direction to the flux of the magnet ring to provide a restraining force to the rotation of the proof mass.

In this manner, the proof mass rotates at a much less r.p.m. than the driving shaft 16. Actually, the driving shaft does not have to rotate at a constant speed but may vary in speed as long as the relative rotation of the drive shaft 16 and the proof mass 18 is high enough to create a flow pattern therebetween, due to the viscosity of the fluid, to produce the desired pressure distribution to radially float the proof mass. Hence, the necessary pressure distribution is obtained between the driving shaft and the proof mass as long as a minimum relative rotation between the members is maintained which, of course, is a function of the geometry and weight of the proof mass. In a device of the size of the preferred embodiment 10, the proof mass will be freely floating if a relative speed of approximately one thousand r.p.m. is maintained between the shaft 16 and the proof mass.

A cylindrical flange structure 48 is fixed to the housing flange 26 to provide a mounting means for one of the restoring coils 24. In this manner, the pair of restoring coils are axially equally spaced from the intermediate permanent magnet ring 20, when the ring is in its unaccelerated position with respect to the E-bridge pick-off. Also, in its floating attitude the proof mass 18, in the illustrated embodiment, is radially spaced from the surface of the drive shaft 16 approximately 0.0001 inch, and the permanent magnet ring 20 is radially spaced from the inner edges of the rings 46, about 0.01 inch. It will be obvious, that these dimensions, as well as the relative dimensions of the proof mass, the driving shaft 16, and the rings 46 are a function of the acceleration forces anticipated, the geometry of the elements, and the r.p.m. of the driving shaft 16.

The E-bridge pick-off 22 consists of two pick-off coils 50 with a pick-off excitation portion 52 therebetween with the rings 46 separating the component parts. FIGURE 2 shows a diagram of the co-action of the E-bridge pick-off and the restoring coils 24 to measure the acceleration along the axis of the housing 12. The magnetic portion of the proof mass serves as the return path for the E-bridge and as the movable portion co-acting with the restoring coils. The E-bridge members are composed of either Alnico-5, iron-cobalt, or the like type of magnetic material.

In the operation of the preferred embodiment 10, the rotating shaft 16 suspends the proof mass 18 on a thin film of fluid. The housing when subjected to acceleration along its longitudinal axis does not affect the proof mass, which tends to remain spacially fixed with respect to the driving shaft and the pick-off means. The relative displacement of the proof mass and the pick-off means is sensed by the E-bridge pick-off 22, which generates a current to energize the restoring coils to move the proof mass back to its original unaccelerated position with respect to the pick-off means. Specifically, the voltage output of the preferred embodiment is proportional to the acceleration along the axis of the housing, and the current supplied to the restoring coils 24 is proportional to the restoring force to keep the proof mass at its original position with respect to the pick-off means. The restoring force is the force necessary to accelerate the proof mass at the same acceleration as the acceleration on the housing.

In brief, any relative displacement between the proof mass 18 and the E-bridge pick-off will be detected by the pick-off. The output of the E-bridge pick-off is amplified, demodulated, and fed back to the restoring coil. A suitable phase sensitive amplifier and demodulator is provided in the circuit, as shown in FIGURE 2, which receives the electrical pick-off output and passes it over a fixed resistance to the restoring coils 24. The voltage output across the fixed resistance is proportional to acceleration since the restoring force generated by the restoring coils to keep the proof mass at its unaccelerated position is proportional to the current supplied to the coils. The magnitude and polarity of the current in the restoring coil is a measure of the acceleration and its direction along the axis of the housing 12.

It should be understood, of course, that the foregoing disclosure relates to only a preferred embodiment of the invention and that it is intended to cover all change and modifications of the example of the invention herein chosen for the purposes of the disclosure, which do not constitute departures from the spirit and scope of the invention as set forth in the appended claim.

What is claimed is:

An accelerometer having a housing, motor means within said housing, said housing being filled with an inert gas, a driving shaft coupled to said motor means, a cylindrical proof mass co-axially floating over said drive shaft and radially spaced therefrom a distance in the order of ten thousandths of an inch, a permanent magnet ring fixed to the exterior surface of said proof mass, electrical pick-off means fixed to the interior of said housing in substantial radial alignment with said permanent magnet ring, a plurality of metal rings fixed to the interior of said housing to co-act with said permanent magnet ring to provide a braking effect to the rotation of said proof mass, restoring coil means fixed to the interior of said housing to co-act with said proof mass and with said integral permanent magnet ring, and means for amplifying and demodulating the output of said electrical pick-off which is proportional to the axial displacement of the proof mass relative to said housing, and means to feed the pick-off output to said restoring coils, so that the magnitude and polarity of the current in the restoring coil is a measure of the acceleration along the axis of said housing.

References Cited in the file of this patent

UNITED STATES PATENTS

| | | |
|---|---|---|
| 2,570,672 | Hathaway | Oct. 9, 1951 |
| 2,591,921 | Cosgriff et al. | Apr. 8, 1952 |
| 2,948,152 | Meyer | Aug. 9, 1960 |
| 2,958,137 | Mueller | Nov. 1, 1960 |
| 2,963,285 | Fischer | Dec. 6, 1960 |
| 2,978,638 | Wing | Apr. 4, 1961 |
| 2,993,382 | Orrange | July 25, 1961 |